United States Patent [19]

Takenouchi et al.

[11] Patent Number: 4,863,085
[45] Date of Patent: Sep. 5, 1989

[54] APPARATUS FOR TRANSPORTING A STRIP OF PHOTOGRAPHIC PRINTING PAPER IN A PRINTER

[75] Inventors: Touru Takenouchi; Hiroshi Miyawaki, both of Wakayama, Japan

[73] Assignee: Noritsu Kenkyu Center Co., Ltd., Wakayama, Japan

[21] Appl. No.: 55,609

[22] Filed: May 29, 1987

[30] Foreign Application Priority Data

Jun. 6, 1986 [JP] Japan .................. 61-130068

[51] Int. Cl.$^4$ .................. G03B 1/56; B65H 20/00
[52] U.S. Cl. .................. 226/92; 226/190
[58] Field of Search .................. 354/319, 320, 321; 226/1, 91–93, 118, 125, 126, 158, 160, 162, 165, 167, 181, 186, 187, 190

[56] References Cited

U.S. PATENT DOCUMENTS

| | | | |
|---|---|---|---|
| 2,899,200 | 8/1959 | Alles | 226/160 |
| 3,282,486 | 11/1966 | DeMoss | 226/190 X |
| 3,522,903 | 8/1970 | Lloyd | 226/190 X |
| 3,948,020 | 4/1976 | Deutsch et al. | 226/91 X |
| 4,066,016 | 1/1978 | Tison | 226/160 X |
| 4,136,946 | 1/1979 | Nishimoto | 355/16 X |

FOREIGN PATENT DOCUMENTS 53-24855  3/1978  Japan .................. 226/190

OTHER PUBLICATIONS

IBM Technical Disclosure Bulletin, Roshon et al., Strip Position Mechanisms, vol. 5, No. 6., Nov. 1962.

*Primary Examiner*—Daniel P. Stodola
*Attorney, Agent, or Firm*—Larson & Taylor

[57] ABSTRACT

An apparatus and method wherein a strip of photographic printing paper which has been subjected to exposure in a printer is intermittently fed by feeding rollers. The side edges of the foremost end part of the printing paper are inserted into an area between a rotational member and pressure contact arms which come in and out of contact with both the side edge portions of the rotational member. Then, the rotation member is rotated by an angular distance equal to an amount of feeding of the printing paper with the aid of the feeding rollers. The pressure contact arm comes in contact with the rotational member at the beginning time of rotation so that the foremost end part of the printing paper is clamped therebetween. After the rotational member rotates by a predetermined angle, it is stopped to form a loop of the printing paper. The rotational member is rotated again after a required amount of storage in the form of a loop is obtained so that the foremost end part is transported toward a delivery roller disposed on a developing machine side and at the same time the pressure contact arm is displaced away from the rotational member. Then, the pressure contact arms are displaced beyond both the side edges of the foremost end part of the printing paper which is located on the delivery roller so that they return to the initial stationary waiting position. Now, the rotational member which is kept in the stationary waiting state and the contact arms wait for coming of the foremost end part of the next printing paper.

2 Claims, 6 Drawing Sheets

APPARATUS FOR TRANSPORTING A STRIP OF PHOTOGRAPHIC PRINTING PAPER IN A PRINTER

BACKGROUND OF THE INVENTION

1. Field of the Invention

The present invention relates to improvement of a method of and apparatus for transporting a strip of photographic printing paper (herein-after referred to as a printing paper) in a printer wherein the method and apparatus are practiced by way of the steps of loading printing paper, allowing it to be subjected to exposure, forming a loop of the printing paper and thereafter delivering it to the next process. More particularly, it relates to a method of and an apparatus for transporting printing paper in a printer in the case where an automatic developing machine is installed behind the printer wherein improvement is made so as to exhibit remarkable advantageous effects when a photographic treating machine is so constructed that a series of treating operations ranging from exposing to developing of printing paper are carried out automatically.

2. Description of the Prior Art

As disclosed in the specifications of U.S. Pat. No. 4,136,946 (corresponding to British Patent No. 1,550,048) and German Laid-Open Patent No. 2,244,960, a conventional photographic treating machine is so constructed that an automatic developing machine is installed behind a printer in alignment with the latter and a series of treating operations ranging from exposure on printing paper to developing are carried out automatically. Specifically, in the conventional photographic treating machine printing paper in the form of a roll is supported in a printing paper feeding section in such a manner that it can be fed therefrom, it is intermittently fed by a predetermined length and it is subjected to exposure at a time of intermittent stoppage. To compensate for the difference between the short time required for the printing operation and the long time required for the developing operation in an automatic developing machine as the well as difference between the manner of intermittent transportation of printing paper after the intermittent feeding operation on the printer side and the manner of the developing operation on the developing machine side accompanied by the transportation of printing paper at a predetermined transporting speed, there is proposed the formation of a loop between an exposure section where exposing is effected for the printing paper in a printer and a feeding section where printing paper is delivered to an automatic developing machine.

As described in the specification of U.S. Pat. No. 4,136,946 (corresponding to British Patent No. 1,550,048), formation of a loop is achieved by way of the steps of opening a light shielded lid disposed at a loop formation place, bringing the foremost end part of printing paper to a delivery port by manual operation and then closing the light shielded lid. However, due to arrangement made for the photographic treating machine in that way there is caused some loss of the end part of printing paper exposed in vain and this loss can not be neglected from the viewpoint of economics or waste. To obviate the above problem there is proposed a transporting means for printing paper as disclosed in the specification of the abovenoted patent but the thus proposed transportation means requires many parts and components such as guide, roller or the like, resulting in the structure of the photographic treating machine becoming complicated. Thus, trouble or failure tends to take place during transportation of printing paper.

BRIEF SUMMARY OF THE INVENTION

Hence, the present invention has been made with the foregoing background in mind and its object resides in providing a method of transporting and apparatus for a strip of photographic printing paper in a printer which assures that transportation of a strip of printing paper in the form of a roll which has been subjected to exposure can be carried out automatically at all time.

Another object of the present invention is to provide a method of transporting a strip of photographic printing paper in a printer which assures that transportation of a strip of photographic printing paper in the form of a roll which has been subjected to exposure can be carried out without any occurrence of warpage which may become a factor of causing curls on the printing paper and a loop is formed without any necessity for loop guide or the like prior to formation of the loop.

Another object of the present invention is to provide a method of transporting a strip of printing paper in a printer which assures that there does not occur any loss of printing paper which is loaded in the printer.

To accomplish the above objects there is proposed according to the present invention a method of and apparatus for transporting a strip of printing paper in a printer wherein the method comprises the steps of and the apparatus comprises means for inserting both the side edges of the foremost end part of the printing paper into an area as defined between a rotational member which is kept in the stationary waiting state and pressure contact arms adapted to come in and out of contact with both the side edge portions of the rotational member, the printing paper being intermittently transported by means of feeding rollers in the printer, rotating the rotational member by an angular distance equal to an amount of feeding of the printing paper with the aid of the feeding rollers, allowing the pressure contact arm to come in contact with the rotational member at the beginning time of rotation so that the foremost end part of the printing paper is clamped therebetween, stopping the rotational member after it rotates by a predetermined angle to form a loop of the printing paper, rotating the rotational member again after a required mount of storage in the form of a loop is obtained so that the foremost end part is transported toward a delivery roller disposed on the side of a developing machine and at the same time displacing the pressure contact arms away from the rotational member, displacing the pressure contact arms beyond both the side edges of the foremost end part of the printing paper which is located on the side of the delivery roller so that they return to the initial stationary waiting position, and waiting for coming of the foremost end part of next printing paper.

Other objects, features and advantages of the present invention will become readily apparent from reading of the following description which has been prepared in conjunction with the accompanying drawings.

BRIEF DESCRIPTION OF THE DRAWINGS

The accompanying drawings illustrate two embodiments of the present invention to facilitate understanding of a method of and apparatus for transporting a strip of printing paper. Thus, illustration is made to such an extent that the structure of the invention can be very easily understood by any expert in the art. On the other hand, for the sake of simplification of illustration parts and components which can be easily designed by any expert in the art are not shown.

FIG. 1 is a schematic view which illustrates an arrangement of components in accordance with the first embodiment which come in direct contact with printing paper in the first stage where a rotary drum serving as a rotational member waits for printing paper which is delivered from feeding rollers.

FIG. 2 is a perspective view of the rotary drum only.

FIG. 3 is a perspective view which illustrates arrangement of the rotary drum and a succeeding roller.

FIG. 4 is a schematic view which illustrates that the foremost end of the printing paper is fed into the area between the rotary drum and a pressure contact arm and the rotary drum starts it rotation in the second stage.

FIG. 5 is a schematic view which illustrates that the rotary drum is rotating while the foremost end of printing paper is clamped between the rotary drum and the pressure contact arm in the third stage.

FIG. 6 is a schematic view which illustates that both the rotary drum and the pressure contact arm are rotated by a predetermined angle while the foremost end of printing paper is clamped therebetween and thereafter they are stopped whereby a certain length of printing paper is stored in the form of a loop in the fourth stage and the fifth stage.

FIG. 7 is a perspective view which illustrates that the rotary drum starts to rotate again together with the pressure contact arm and the foremost end of printing paper is displaced toward an initial delivery roller in the sixth stage.

FIG. 8 is a perspective view which illustrates that the foremost end of printing paper is displaced to the initial delivery roller and the rotary drum is returning to the initial position together with the pressure contact arm in the seventh stage, and FIGS. 9(A) and (G) are a schematic view respectively which illustrate operation of the components in accordance with the order of operations in the case of a second embodiment of the invention.

DESCRIPTION OF THE PREFERRED EMBODIMENT

Now, the present invention will be described in a greater detail hereunder with reference to the accompanying drawings which illustrate preferred embodiments thereof.

First, description will be made below with reference to FIG. 1 as to arrangement of components constituting the photographic printing paper transporting apparatus of the invention which is required for practicing the method of the invention as well as an operative state in the first stage where a rotary drum waits for the foremost end of a strip of photographic printing paper which is transported from a feeding roller for practicing the invention. Next, description will be made with reference to FIG. 2 as to the novel rotary drum which constitutes a component for the apparatus. Further, description will be made as to arrangement of a succeeding roller in cooperation with the rotary drum with reference to FIG. 3. Finally, description will be made with reference to FIGS. 1, 4, 5, 6, 7 and 8 as to how transporting of the printing paper is carried out.

Figure 1:
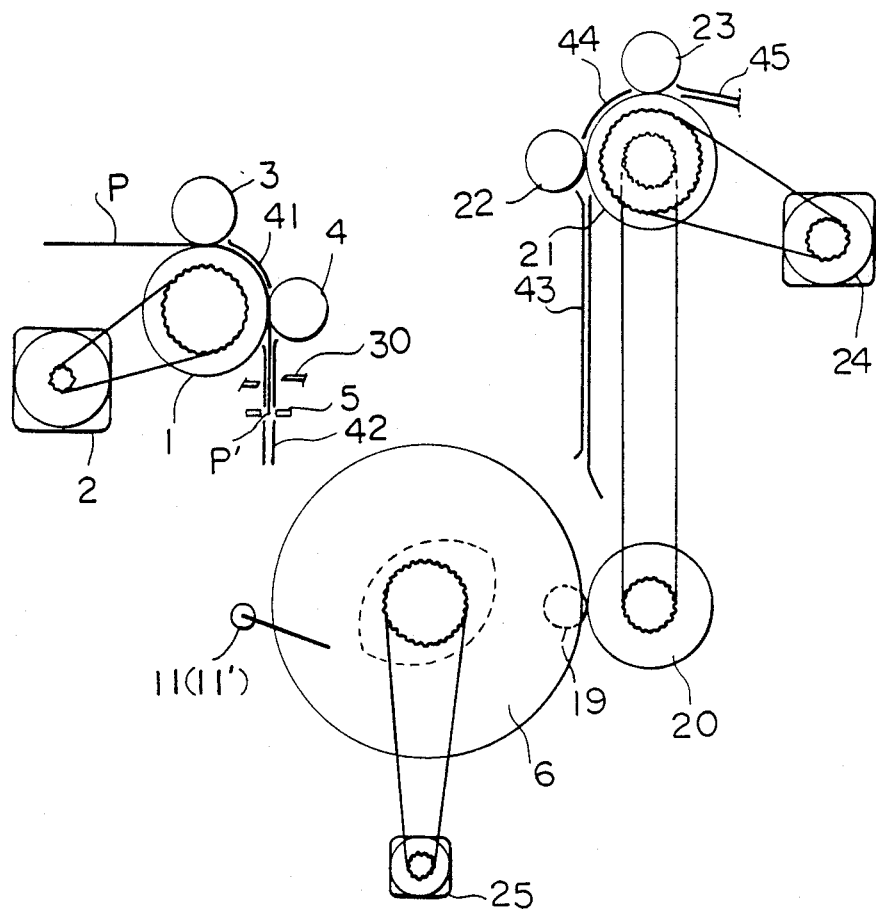
FIGS. 1 to 8 illustrates a first embodiment of the invention and FIG. 9 illustrates a second embodiment of the same.

In FIG. 1 reference numeral 1 designated a feeding roller adapted to be actuated at every time when exposing is completed for the printing paper P in the printer wherein the feeding roller is driven by means of a conventional stepping motor 2 and reference numerals 3 and 4 designate press rollers employable for transporting the printing paper P in cooperation with the feeding roller 1 respectively. Reference numeral 5 designates a sensor for detecting the foremost end P' of the printing paper P which is transported from the feeding roller 1 and the press rollers 3 and 4 wherein the sensor 5 comprises an emitter and receiver and reference numeral 6 designates a rotary drum serving as a rotational member which is driven by a stepping motor 25. The rotary drum 6 will be described in more detail later. Reference numerals 11 and 11' designate a pressure contact arm as described later. Reference numerals 19 and 20, respectively, designate a pressure contact roller and a transporting roller to construct a succeeding roller as described later; reference numeral 21 designates a delivery roller for delivering an exposed printing paper to a developing machine wherein the delivery roller 21 is driven by a motor 24; reference numerals 22 and 23 designate pressure contact rollers adapted to cooperate with the delivery roller 21; and reference numeral 30 designates a cutter; and reference numerals 41 and 44, as well as 42, 43 and 45, designates guides for the printing paper P.

Figure 2:
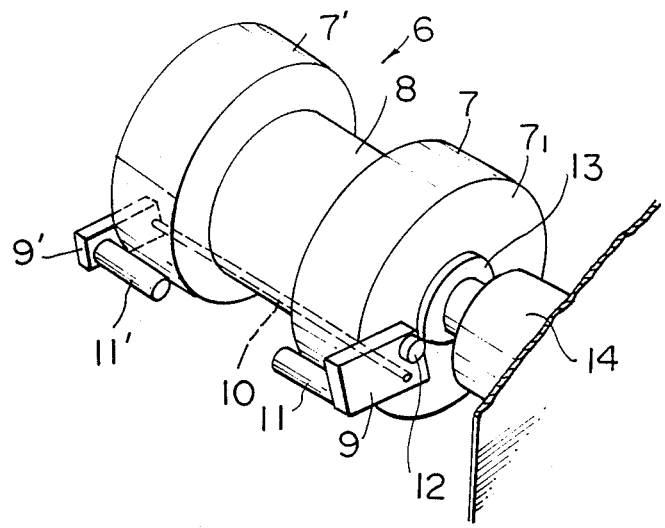

Next, description will be made below as to the structure of the rotary drum 6 serving as rotational member with reference to FIG. 2. As the rotary drum 6 comprises larger printing paper clamping and transporting portions 7 and 7' and a smaller diameter pressure contact roller receiving portion 8, wherein the printing paper clamping and transporting portions 7 and 7' are intended to transport printing paper P while both the side edges of the foremost end part P' of the printing paper P are clamped and the smaller diameter pressure contact roller receiving portion 8 is intended to receive the pressure contact roller 19 which serves as succeeding roller for delivering the printing paper to the developing machine.

The rotary drum 6 is formed with a through hole in parallel with the axis of the rotary drum 6 through which a shaft 10 is inserted turnably. The pressure contact arm actuating plates 9 and 9' are fixed to the shaft 10 at the positions which are located out of phantom line extending through the axis of the drum and a rotational contact roller 12 to be turnable along the outer side walls $7_1$ and $7_1'$ of the rotary drum 6 in the radial direction in paralle with one another.

Figure 3:
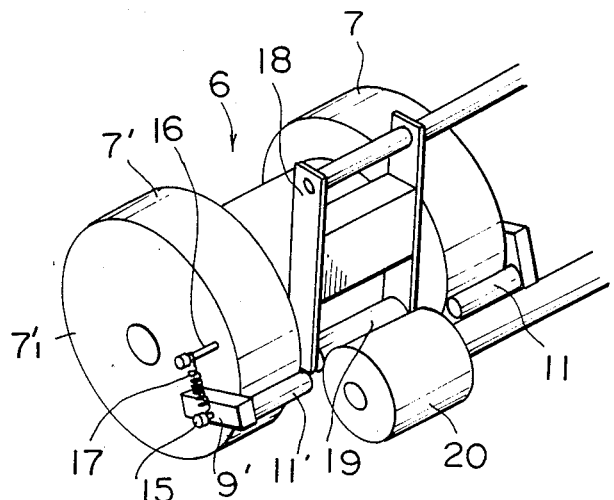

Pressure contact arms 11 and 11' adapted to cooperate with the printing paper clamping and transporting portions 7 and 7' are projected from the end part of the pressure contact arm actuating plates 9 and 9'. Further, a rotational contact roller 12 is rotatably supported at the position located closer to the end than the part of the shaft 10 on the pressure contact arm actuating plate 9. Specifically, the rotational contact roller 12 is adapted to roll on a cam 13 having a smaller diameter arched cam face which allows the pressure contact arms 11 and 11' to be brought into pressure contact with the printing paper clamping and transporting portions 7 and 7' and a larger diameter arched cam face which allows the pressure contact arms 11 and 11' to come out of contact during rotation of the rotary drum by one revolution. It should be noted that the cam 13 is fixedly secured to a bearing boss 14 for the shaft of the rotary drum 6. As shown in FIG. 3, a pulling spring 17 is spanned between a pin 15 on the pressure contact arm actuating plate 9' and a pin 16 on the outer wall 7₁' of the printing paper clamping and transporting arm actuating plate 7'.

Next, description will be made as to the structural relation between the rotary drum 6 and a succeeding roller adapted to take the printing paper P with reference to FIG. 3. A pressure contact roller 19 constituting the succeeding roller is rotatably supported on a shaft which is supported by a holding frame 18 so that one end extends in the pressure roller receiving portion 8 between the printing paper clamping and transporting portions 7 and 7' and serves as a guide for the foremost end part P. The outer peripheral surface of the roller 19 is so designed that it protrudes by an appreciable distance from the outer peripheral surface of the printing paper clamping and transporting portions. A transporting roller 20 which comes in pressure contact with the pressure contact roller 19 is driven by means of a motor 24 via the delivery roller 21.

Finally, description will be made below with reference to FIG. 1, 4, 5, 6, 7 and 8 as to how the printing paper P is transported.

A strip of printing paper P held in the form of a roll in the printer is intermittently delivered by a predetermined length and exposing of the printing paper is carried out at every time when feeding of the printing paper is interrupted. On completion of exposure printing paper P is intermittently delivered by means of the feeding roller 1 and the pressure contact rollers 3 and 4 adapted to cooperated with the feeding roller 1 and the foremost end P' of the printing paper P is detected by a sensor 5. Incidentally, the feeding roller 1 is driven by means of a stepping motor 2 which is rotated in synchronization with the intermittent feeding action by a predetermined length, and thereby the operative state as shown in FIG. 1 where the foremost end P' of the printing paper P is detected by the sensors 5 is assumed.

At this moment the rotary drum 6 serving as a rotational member is stopped and the pressure contact arms 11 and 11' are parted away from the printing paper clamping and transporting portions 7 and 7' on both the sides by means of the actuating plate 9 contacting the larger diameter arched cam face on the cam 13 and when the foremost end P' of the printing paper P enters in the area as defined between the printing paper clamping and transporting portions 7 and 7' and the pressure contact arms 11 and 11' and thereby the operative state where transportation can be carried out is obtained, the sensor 5 tranmits such a signal that the stepping motor 25 is synchronized with the stepping motor 2 and the rotary drum 6 is rotated at the same peripheral speed as that of the feeding roller 1. At the same time another signal for driving the motor 24 is transmitted. It should be noted that the position where the delivery roller 1, the sensor 5 and the rotary drum 6 are located is determined previously.

Figure 4:
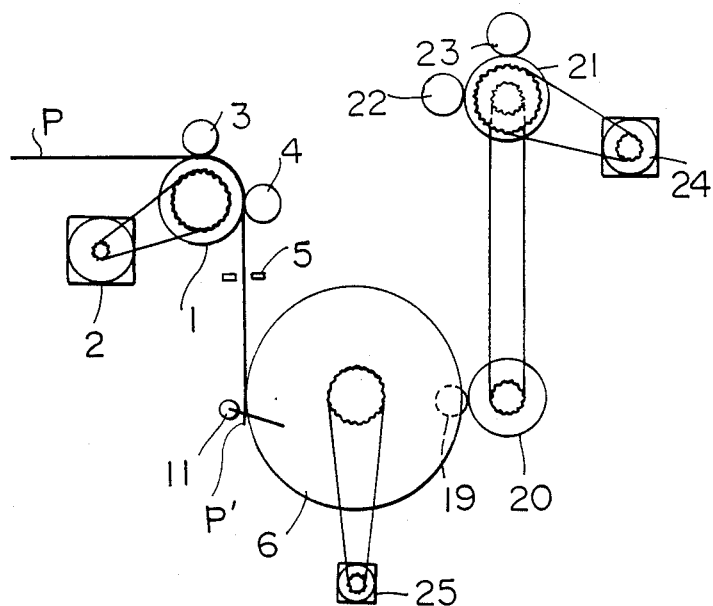

To carry out the next operation (of exposure on the printing paper P and intermittent feeding of the same,) the foremost end P' of the printing paper P is introduced into the area between the printing paper clamping and transporting portions 7 and 7' and the pressure contact arms 11 and 11' and thereby an operative state as shown in FIG. 4 is assumed with the result that the stepping motor 25 becomes activated and the rotary drum 6 starts its operation.

Figure 5:
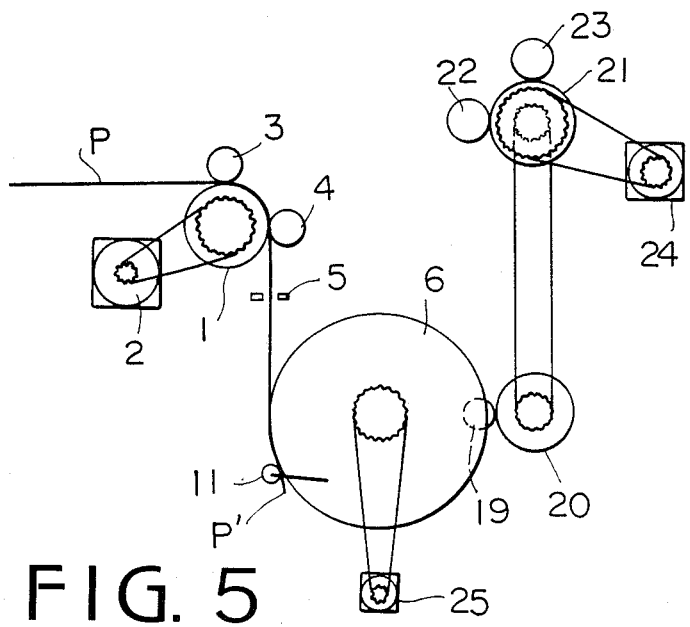

At the substantially same time as the rotary drum 6 starts to rotate, the contact roller 12 moves to the smaller diameter arched cam face on the cam 13 and the foremost end P' of the printing paper P is clamped between the printing paper clamping and tarnsporting portions 7 and 7' and the pressure contact arms 11 and 11'. Thus, as shown in FIG. 5, the printing paper P is transported by means of the rotary drum 6 at the same peripheral speed as that of the feeding roller 1 in synchronization with of the latter.

Figure 6:
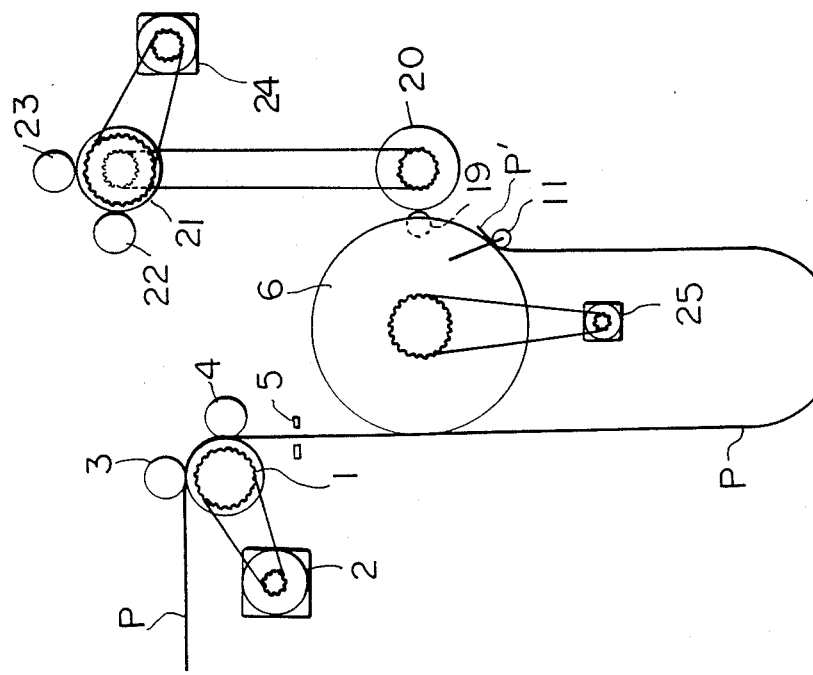

When the rotary drum 6 is rotated by a predetermined angle together with the pressure contact arms 11 and 11', the stepping motor 25 is stopped and the rotary drum 6 also stops its rotation. Thus, the printing paper P forms a loop as shown in FIG. 6, as it continues to be fed and transported.

Figure 7:
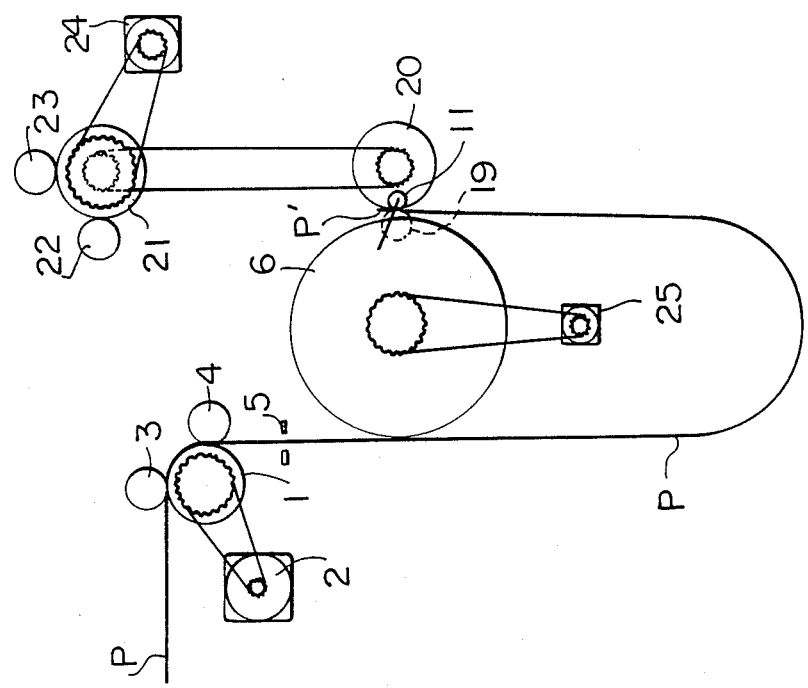

When a certain period of time elapses until a required length of loop is formed, the stepping motor 25 is activated and the foremost end P' of the printing paper P is inserted into the area as defined between a pressure contact roller 19 and a transporting roller 20, as shown in FIG. 7.

Figure 8:
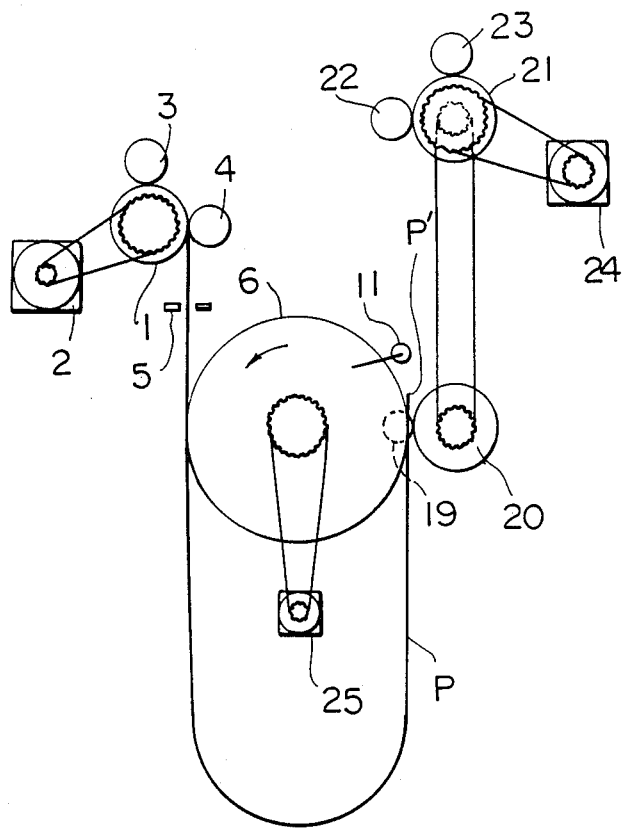
Figure 9A:
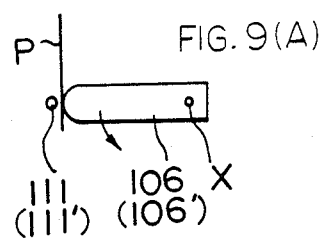
Figure 9B:
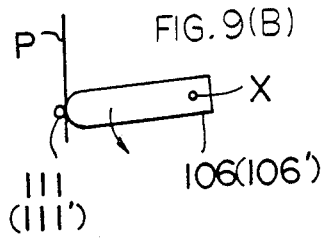
Figure 9C:
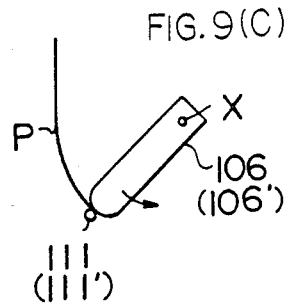
Figure 9D:
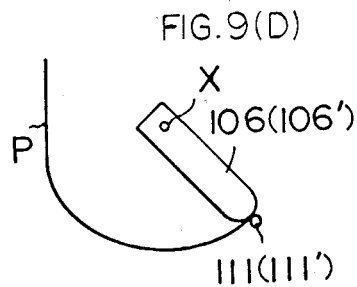
Figure 9E:
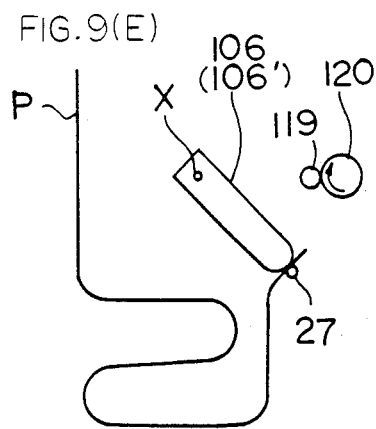
Figure 9F:
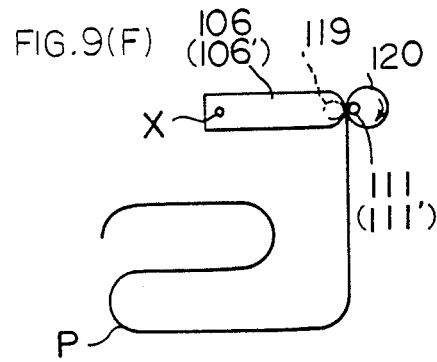
Figure 9G:
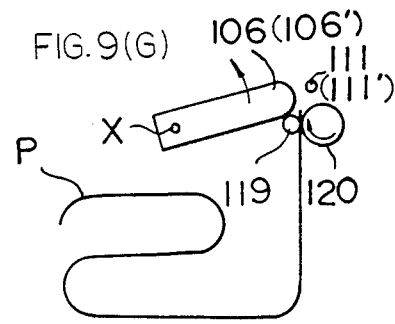

At the same time when the aforesaid movement is achieved, the contact roller 12 is displaced to the larger diameter arched cam face and the actuating plates 9 and 9' are turned against resilient force of the pulling spring 17 whereby the pressure contact arms 11 and 11' are parted away from the printing paper clamping and transporting portions 7 and 7' and the foremost end P' of the printing paper P is released from the clamped state. This causes the rotary drum 6 to rotate at a higher rotational speed and it returns to the initial position via a course as shown in FIG. 8 to stop there. Next, the rotary drum 6 is caused to wait for coming of the foremost end P' of the printing paper P. Then, the printing paper P which is ready to be transported by means of the pressure contact roller 19 and the transporting roller 20 is delivered to the developing machine with the aid of the delivery roller 21 and the pressure contact rollers 22 and 23 adapted to cooperated with the delivery roller 21.

In the above-mentioned embodiment the rotary drum 6 is employed for the purpose of holding and transporting the printing paper P while the foremost end part P' of the printing paper P is clamped but the present invention should not be limited only to this embodiment. In the second embodiment of the invention as shown in FIG. 9 rotary arms 106 and 106' (one of them being not shown) which are disposed in the spaced relation and of which one end is fixedly secured to a rotational shaft X and rotated by the rotational shaft X are employed in place of the rotary drum 6. In this embodiment the foremost end P' of the printing paper P is clamped between the other ends of the rotary arms 106 and 106' and pressure contact arms 111 and 111' (one of them being not shown) adapted to come in contact and out of contact with the rotary arms 106 and 106'.

Operation of the apparatus is same as that in the first embodiment but description will be briefly made below with reference to FIGS. 9(A) to 9(G). The rotary arms 106 and 106' are kept in the waiting state until the foremost end part P' of the printing paper P is fed to a predetermined position (see FIG. 9(A)). When the foremost end part P' of the printing paper P is fed to the predetermined position, both the rotary arms 106 and 106' start their rotation and the foremost end part P' of the printing paper P is firmly held by allowing the pressure contact arms 11 and 111' to come in pressure contact with the rotary arms 106 and 106' (see FIG. 9(B)). While the foremost end part P' of the printing paper P is kept in the clamped state, the rotary arms 106 and 106' are caused to rotate in compliance with the length of the printing paper P which is fed (see FIG. 9(C)). When the rotary arms 106 and 106' are rotated to a predetermined angle, rotation of them is interrupted (see FIG. 9(D)). Since the printing paper P continues to be fed in spite of the fact that rotation of the rotary arms 106 and 106' is interrupted, the printing paper P builds a loop naturally and it is storted in the lower area (see FIG. 9(E)). When a required loop of the printing paper P is built, the rotary arms 106 and 106' are rotated again while the foremost end part P' of the printing paper P is clamped, the foremost end part P' of the printing paper P is delivered to an area between the pressure contact roller 119 and the transporting roller 120 (see FIG. 9(F)). When the foremost end P' of the printing paper P is handed over to the area as defined between the pressure contact roller 119 and the transporting roller 120, the pressure contact arm 111 and 111' are parted away from the rotary arm 106 and 106' (see FIG. 9(G)) and at the same time rotational speed of the rotary arms 106 and 106' increases with the result that the pressure contact arms 111 and 111' move over the printing foremost end part P' of the printing paper P and the arms 106 and 106' return to their initial position (see FIG. 9(A)).

As will be apparent from the above description, a method of and apparatus for transporting a printing paper in a printer is practiced in accordance with the first and second embodiment by way of the steps of and means for loading a strip of printing paper at a printing paper loading portion in the printer and setting the foremost end paper P' to the position located in the proximity of the feeding roller 1 via a delivery roller and exposure portion of the conventional printer so that the printing paper is transported automatically via all the following steps. To carry out automatic transporting in that way there is not necessary for any guide for forming a loop and moreover usage of other guide, guide roller or the like can be minimized. Thus, the printing paper is transported from the printer to the developing machine without any loss of usage of the printing paper P, any occurence of warpage which is a factor of causing curl and any damage of injury on exposed surface of the printing paper. Accordingly, a strip of printing paper P is transported from the printer to the developing machine without any hindrance encountered.

While the present invention has been described above only with respect to two preferred embodiments, it should of course be understood that it should not be limited only to them but various changes or modifications can be made in any acceptable manner without departure from spirit and scope of the invention as defined by the appended claims.

What is claimed is:

1. An apparatus for transporting a strip of photographic printing paper in a printer comprising:
   a rotational member having two larger diameter side edge portions against which respective side edges of a foremost end part of the strip of printing paper are held and transported by rotation of said rotational member and a smaller diameter central portion between said larger diameter side edge portions;
   a succeeding roller means for receiving the foremost end part of the strip of printing paper and for delivering the strip of printing paper toward a developing machine, said succeeding roller means including a pressure contact roller received between said large diameter side edge portions and within said smaller diameter central portion;
   a respective pressure contact arm for each said larger diameter side edge portion which is adapted to come in and out of contact with the respective said larger diameter side edge portion whereby the foremost end of the strip of printing paper is held during rotation of said rotational member and then released therefrom;
   a respective pressure contact arm actuating plate for a respective said pressure contact arm which extends along a respective outer wall of said rotational member, each said actuating plate having a distal end on which a respective said pressure contact arm is mounted and a proximal end which is rotatably mounted to said rotational member;
   a cam means having a cam surface for moving said actuating plates such that said pressure contact arms are out of engagement with said larger diameter side edge portions when the foremost end of the strip of printing paper is received between said pressure contact arms and said larger diameter side edge portions and when the foremost end is received in said succeeding roller means and such that said pressure contact arms hold the foremost end of the printing paper against said larger diameter side edge portions as the foremost end of the printing paper is transported to said succeeding rollers means by rotation of said rotation member; and
   an urging means for urging said actuating plates into slide contact cooperation with said cam means.

2. An apparatus for transporting a strip of photographic printing paper in a printer comprising:
   a rotational member having two larger diameter side edge portions against which respective side edges of a foremost end part of the strip of printing paper are held and transported by rotation of said rotational member and a smaller diameter central portion between said larger diameter side edge portions;
   a succeeding roller means for receiving the foremost end part of the strip of printing paper and for delivering the strip of printing paper toward a developing machine, said succeeding roller means including a pressure contact roller received between said large diameter side edge portions and within said smaller diameter central portion;
   a respective pressure contact arm for each said larger diameter side edge portion which is adapted to come in and out of contact with the respective said larger diameter side edge portion whereby the foremost end of the strip of printing paper is held during rotation of said rotational member and then released therefrom; and
   wherein said succeeding roller means further includes a transporting roller adapted to come into contact with said pressure contact roller and a holding frame which guides the strip of printing paper and on which said pressure contact roller is rotatably mounted within said smaller diameter central portion and with an outer peripheral surface of said pressure contact roller radially projecting outwardly beyond said larger diameter side edge portions.

* * * * *